United States Patent
Pfitzner et al.

(10) Patent No.: US 9,631,505 B2
(45) Date of Patent: Apr. 25, 2017

(54) DEVICE FOR COOLING A WALL OF A COMPONENT

(71) Applicant: Rolls-Royce Deutschland Ltd & Co KG, Blankenfelde-Mahlow (DE)

(72) Inventors: Michael Pfitzner, Warngau (DE); Bernhard Kroess, Markt Schwaben (DE); Peter Schreivogel, Munich (DE)

(73) Assignee: ROLLS-ROYCE DEUTSCHLAND LTD & CO KG, Blankenfel De-Mahlow (DE)

( * ) Notice: Subject to any disclaimer, the term of this patent is extended or adjusted under 35 U.S.C. 154(b) by 300 days.

(21) Appl. No.: 14/517,317

(22) Filed: Oct. 17, 2014

(65) Prior Publication Data
US 2015/0107798 A1    Apr. 23, 2015

(30) Foreign Application Priority Data
Oct. 18, 2013   (DE) .......................... 10 2013 221 227

(51) Int. Cl.
| F24D 19/02 | (2006.01) |
| F01D 9/02 | (2006.01) |
| F01D 5/18 | (2006.01) |
| F23M 5/08 | (2006.01) |
| F23R 3/00 | (2006.01) |
| F23R 3/06 | (2006.01) |

(52) U.S. Cl.
CPC ............ *F01D 9/023* (2013.01); *F01D 5/186* (2013.01); *F23M 5/085* (2013.01); *F23R 3/005* (2013.01); *F23R 3/06* (2013.01); *F23R 2900/03041* (2013.01); *F23R 2900/03043* (2013.01); *Y02T 50/676* (2013.01)

(58) Field of Classification Search
CPC .. F23R 3/005; F23R 3/06; F23R 2900/03041; F23R 2900/03043; F01D 9/023; F01D 5/186; F01D 5/187; F01D 5/183
USPC ...................................... 165/49, 56
See application file for complete search history.

(56) References Cited

U.S. PATENT DOCUMENTS

| 5,419,681 A | 5/1995 | Lee |
| 6,234,755 B1 | 5/2001 | Bunker et al. |
| 6,383,602 B1 | 5/2002 | Fric et al. |

(Continued)

FOREIGN PATENT DOCUMENTS

| DE | 102009003634 | 10/2009 |
| EP | 1091090 | 4/2001 |

OTHER PUBLICATIONS

European Search Report dated Jun. 1, 2015 for related European Patent Application No. 14189310.7.

*Primary Examiner* — Davis Hwu
(74) *Attorney, Agent, or Firm* — Shuttleworth & Ingersoll, PLC; Timothy J. Klima

(57) ABSTRACT

The present invention relates to a device for cooling a wall of a component, where a fluid flow flows parallel to the wall, with at least one inflow duct, the center axis of which being arranged inclined to the plane of the wall, with a groove provided in the wall, into which issues the inflow duct, where a wall of the groove is designed contoured downstream of a discharge opening of the inflow duct and has an inflow edge facing the discharge opening, characterized in that the groove extends on both sides of the discharge opening and adjacent to the inflow edge at an angle to the direction of the fluid flow, and has a narrowing width.

20 Claims, 2 Drawing Sheets

(56) References Cited

Figure 1:
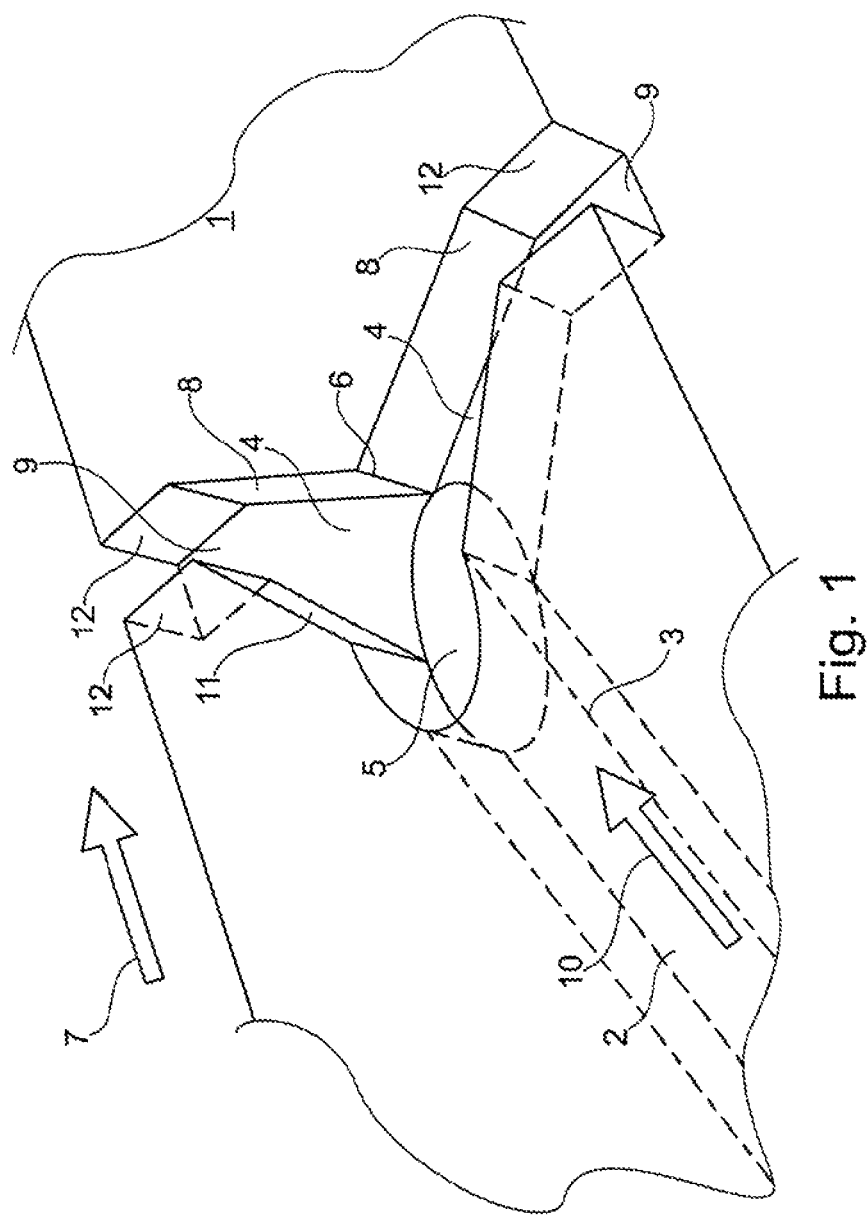

U.S. PATENT DOCUMENTS 9,206,696 B2 * 12/2015 Bunker ................. F01D 5/187
2009/0246011 A1 10/2009 Itzel
2011/0305582 A1 12/2011 Lee et al.

* cited by examiner

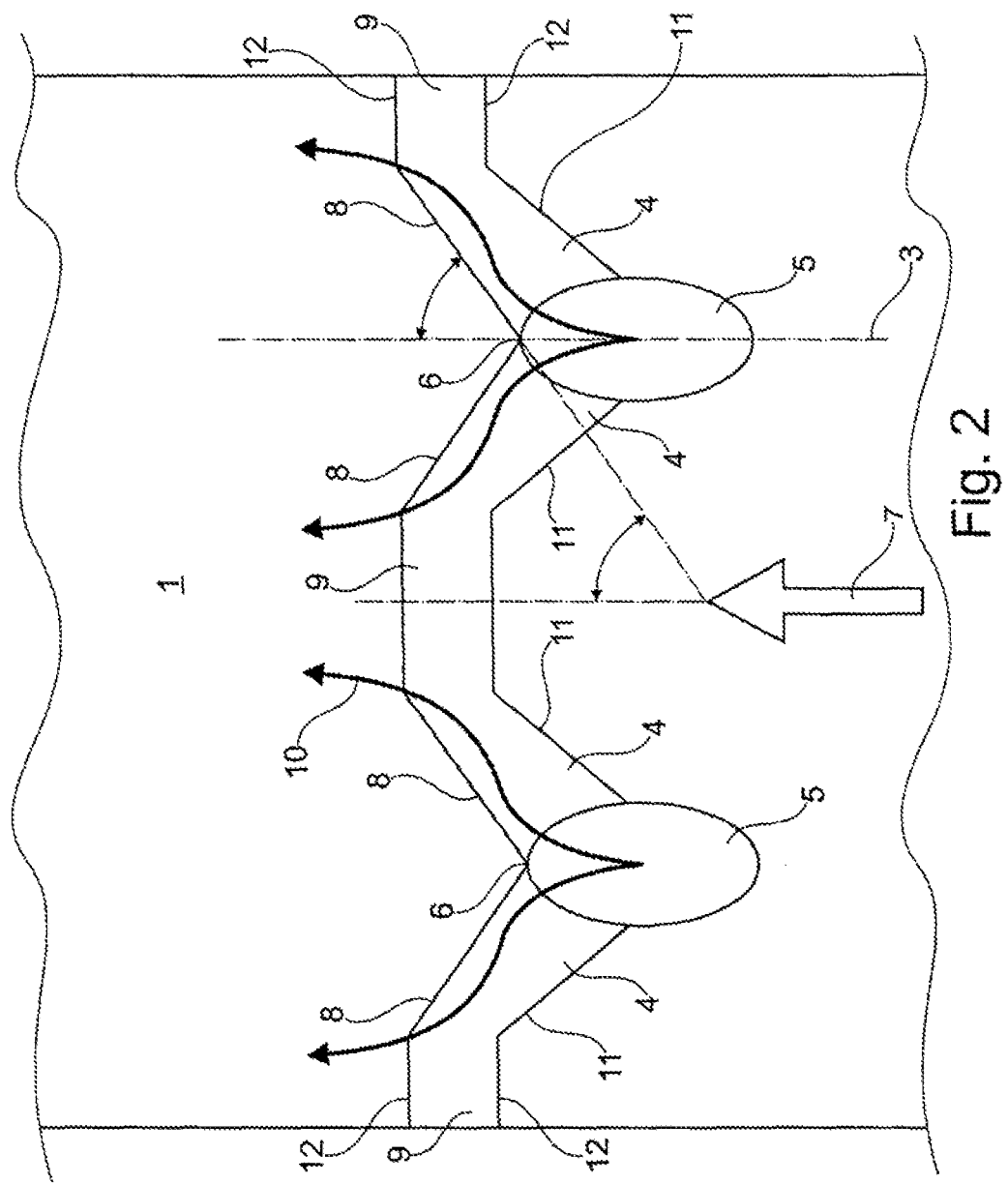

DEVICE FOR COOLING A WALL OF A COMPONENT

This application claims priority to German Patent Application DE102013221227.5 filed Oct. 18, the entirety of which is incorporated by reference herein.

This invention relates to a device for cooling a wall of a component.

In particular, this invention relates to a device for cooling a wall, along which a fluid flow flows. Walls of this type are for example combustion chamber walls or surfaces of turbine blades of a gas turbine.

The device in accordance with the invention has at least one inflow duct through which cooling air or cooling fluid is supplied. A center axis of the inflow duct is arranged inclined to the plane of the wall. It is evident here that the wall as a whole does not have to be flat, but can also have a contour or bulge. The term "plane of the wall" must therefore be understood as relating to the surface area of the wall adjoining the outflow area of the cooling fluid flow.

The flow of cooling fluid or cooling air exiting through the inflow duct and out of its discharge opening is guided along the surface of the wall and effects effusion cooling.

The discharge opening of the inflow duct issues into a groove provided in the wall. Downstream of the discharge opening, a wall of the contoured groove has an inflow edge.

A device of the type described is already known from U.S. Pat. No. 6,234,755 B1. The device shown there has a groove extending at right angles to the fluid flow. A plurality of inflow ducts, whose discharge areas are each widened like a diffusor, issue next to one another into the groove, which has a straight rear wall upstream. As a result, the cooling airflow entering it is slowed down. Opposite and hence downstream of the fluid flow, the groove has a plurality of inflow edges placed next to one another; they split the cooling airflow exiting the respective discharge openings. The cooling air is thus greatly slowed down inside the groove and flows in an uncontrolled manner onto the wall of the component to be cooled. In so doing, the cooling airflow initially separates from the surface of the wall in the area of the deflection and in the area of its exit out of the groove. This causes a steep reduction in the cooling effect. Furthermore, the discharge of the cooling air into the groove leads to a sharp deflection of the cooling air such that this air penetrates deeply into the fluid flow. This too reduces the cooling effect. In addition, in the previously known solution hot gas from the fluid flow penetrates into the groove, in particular into areas between the discharge openings of the inflow ducts, and likewise leads to a reduction in the cooling effect.

U.S. Pat. No. 6,383,602 B1 shows inflow ducts arranged at an angle which issue into a surface of a wall and through which an effusion cooling airflow is applied onto the surface of the wall.

The solutions known from the state of the art lead to an uncontrolled exit of the cooling fluid flow, such that no effective effusion cooling over the entire surface of the component wall is achieved.

The object underlying the present invention is to provide a device of the type specified at the beginning, which while being simply designed enables effective effusion cooling of the component wall.

It is a particular object to provide solution to the above problems by a combination of features described herein. Further advantageous embodiments will become apparent from the present description.

It is thus provided in accordance with the invention that the groove extends on both sides of the discharge opening and adjacent to the inflow edge, at an angle to the direction of the hot fluid flow, and has a narrowing width.

Due to the embodiment in accordance with the invention, an even distribution of the cooling airflows exiting the inflow ducts is achieved without the cooling air separating from the component wall during its transition to the latter. Due to the solution in accordance with the invention, stable flow conditions result even in the case of high cooling air mass flows, and ensure an even application of the effusion cooling layer onto the wall of the component. Due to the improved lateral cooling air distribution resulting from the invention, a stable two-dimensional effusion cooling film is generated which flows in direct contact to the component wall to be cooled.

The invention can be used in particular for the cooling of thermally highly loaded components in gas turbines, in particular in combustion chamber walls and turbine blades of aircraft engines. The result of the formation of a stable effusion cooling air layer exiting the groove is a dependable and stable cooling of the component wall. It is thus possible by means of the device in accordance with the invention to minimize both the cooling air requirement and the number of inflow ducts needed.

Due to the embodiment of the groove provided in accordance with the invention, said groove extending on both sides of the discharge opening at an angle to the fluid flow, operationally reliable guidance of the cooling air inside the groove is achieved, which prevents hot gas from entering the groove. Furthermore, the cooling air exiting through the discharge opening of the inflow duct is sufficiently slowed down and guided such that the cooling air flows evenly out of the groove and contacts the surface of the component wall. The cooling air is thus guided by the groove. The narrowing width of the groove compensates for the cooling air volume steadily exiting the groove, so that the medium flow velocity of the cooling air along the groove is substantially constant over the length of the groove. This results in an improved overall cooling effect.

It is provided in a favourable embodiment of the invention that the inflow edge is arranged at right angles to the surface of the wall. This results in an even deflection and distribution of the cooling air flowing out of the inflow duct.

It is furthermore provided in a favourable embodiment of the invention that the side walls of the groove are likewise at right angles to the surface of the wall.

This too leads to an optimized flow behaviour of the cooling air inside the groove. This behaviour can also be assisted when the groove has a constant depth in a favourable development of the invention. It is however also possible to design the groove with a variable depth which for example decreases starting from the discharge opening.

The inflow duct preferably has in accordance with the invention a circular cross-section, resulting here in an elliptically shaped discharge opening. Due to the circular cross-section and the inclined arrangement of the center axis of the inflow duct, cooling air is blown into the groove already in a flow-optimized way.

It is provided in accordance with the invention that several inflow ducts are positioned next to one another and arranged transverse to the direction of the fluid flow. The lateral grooves adjoining the discharge openings are here in each case connected to one another by means of a connecting groove, which is preferably arranged at right angles to the flow direction of the fluid flow, but can however also be aligned at a different angle. This results in the top view in a wave-like or zig-zag-like course of the groove, contributing to an even guidance of the cooling air exiting the discharge openings.

It is possible in accordance with the invention to adapt the design of the groove to the respective operating conditions in order to provide an even cooling film with increased cooling effectiveness. It is thus possible, depending on the respective operating conditions, to achieve a reduction in the cooling air requirement and/or a reduction in the number of inflow ducts.

The present invention is described in the following in light of the accompanying drawing showing an exemplary embodiment. In the drawing, FIG. 1 shows a simplified perspective partial view of a device in accordance with the present invention, and FIG. 2 shows a top view onto the exemplary embodiment illustrated in FIG. 1.

The figures show in a schematic and simplified form a wall 1 of a component. The wall does not, as already mentioned, have to be designed flat. A fluid flow 7, for example a hot gas, flows along the wall. The component is for example part of a combustion chamber wall or part of a turbine blade. Several inflow ducts 2 issue into the surface of the wall 1 and have a substantially circular cross-section (not shown), and their center axes 3 are each arranged inclined to the surface of the wall 1. The result is thus elliptical discharge openings 5 through which cooling fluid (cooling air) 10 flows into a groove 4. As can be seen from FIG. 1 in particular, an inflow edge 6 is provided downstream of and opposite to the discharge opening 5. The downstream-arranged side wall 8 of the groove 4 is thus contoured and, facing the discharge opening 5, designed V-shaped when viewed from top, as can be seen from FIG. 2 in particular. It is evident that the two grooves laterally adjoining the discharge opening 5 are each designed and arranged symmetrically to the center axis 3 of the inflow duct 2.

The groove 4 has in its longitudinal direction, starting from the discharge opening 5, a narrowing cross-section and merges into a connecting groove 9. This groove is, as can be seen from FIG. 2, arranged substantially at right angles to the hot fluid flow 7. The result is a wave-like or zig-zag-shaped course of the total groove, which is made up of the individual grooves 4 starting at the sides of the discharge openings 5 and of the respective connecting grooves 9.

The lateral tapering or reduction of the cross-section of the groove 4 results in a constant mean flow velocity along the groove 4. The remaining cooling air exiting the groove 4 and flowing into the connecting groove 9 is also applied in an even manner onto the surface of the wall 1, as shown schematically by the cooling fluid flows 10 according to FIG. 2.

The connecting grooves 9 have a constant cross-section and are, like the grooves 4, designed with side walls which are oriented at right angles to the surface of the wall 1 and hence to the fluid flow 7.

As shown by FIG. 2 in particular, the grooves 4 are each arranged at an angle to the direction of the fluid flow 7 or to the outflow direction from the discharge opening 5. The result is an even lateral distribution of the cooling air. By adapting the cross-sections of the grooves 4 and of the connecting grooves 9, and by altering the angles in which the grooves 4 extend, optimization and adaptation to the respective component-related flow conditions are possible in accordance with the invention.

The inflow edge 6 and the V-shaped or triangular design of the side walls of the adjacent grooves 4 lead to an optimized lateral deflection of the flow of the cooling fluid 10 and reduce the momentum of the cooling air jet exiting the discharge opening 5, so that vertical penetration into the main flow (fluid flow 7) is prevented or reduced. Due to the narrow design of the grooves 4 and of the connecting grooves 9, as provided in accordance with the invention, complete filling with cooling fluid is achieved, so that mixing with hot gas from the fluid flow 7, in particular in the area between the discharge openings 5, is prevented or reduced.

It is possible in accordance with the invention to design the side walls 8 adjoining the inflow edge 6, the side walls 11 at the upstream rim area of the grooves 9 and the side walls 12 of the connecting groove 9 not at right angles but at an inclined angle to the surface of the wall 1 of the component. In accordance with the invention, differences and optimizations of the cross-sections of the grooves 4 and of the connecting grooves 9 are also possible.

LIST OF REFERENCE NUMERALS

1 Wall
2 Inflow duct
3 Center axis
4 Groove
5 Discharge opening
6 Inflow edge
7 Fluid flow
8 Side wall
9 Connecting groove
10 Cooling fluid
11, 12 Side wall

What is claimed is:

1. A device for cooling a wall of a component, where a fluid flow flows parallel to the wall, comprising:
   at least one inflow duct having a center axis arranged inclined to a surface of the wall and a discharge opening,
   a groove provided in the wall, into which the at least one inflow duct issues,
   wherein a wall of the groove is contoured downstream of the discharge opening of the at least one inflow duct and has an inflow edge facing the discharge opening,
   wherein the groove extends on both sides of the discharge opening and adjacent to the inflow edge at an angle to a direction of the fluid flow, and has a narrowing width,
   wherein the inflow edge is arranged at right angles to the surface of the wall.

2. The device in accordance with claim 1, wherein the groove has side walls and the side walls of the groove are provided at right angles to the surface of the wall.

3. The device in accordance with claim 1, wherein the groove has a constant depth.

4. The device in accordance with claim 1, and further including at least one chosen from the inflow duct having a circular cross-section and the discharge opening being elliptically shaped.

5. The device in accordance with claim 1, wherein the at least one inflow duct includes a plurality of inflow ducts with discharge openings arranged next to one another and transverse to the direction of the fluid flow, and further comprising a plurality of grooves provided in the wall, into which the plurality of inflow ducts issue, the plurality of grooves being connected to one another by at least one connecting groove.

6. The device in accordance with claim 5, wherein the at least one connecting groove extends at right angles to the direction of the fluid flow.

7. The device in accordance with claim 6, wherein the at least one connecting groove has a constant cross-section.

8. The device in accordance with claim 1, wherein the component is a turbine blade of a gas turbine.

9. The device in accordance with claim 1, wherein the component is a combustion chamber wall of a gas turbine.

10. The device in accordance with claim 5, wherein the at least one connecting groove has a constant cross-section.

11. A device for cooling a wall of a component, where a fluid flow flows parallel to the wall, comprising:
   at least one inflow duct having a center axis arranged inclined to a surface of the wall and a discharge opening,
   a groove provided in the wall, into which the at least one inflow duct issues,
   wherein a wall of the groove is contoured downstream of the discharge opening of the inflow duct and has an inflow edge facing the discharge opening,
   wherein the groove extends on both sides of the discharge opening and adjacent to the inflow edge at an angle to a direction of the fluid flow, and has a narrowing width,
   wherein the at least one inflow duct includes a plurality of inflow ducts with discharge openings arranged next to one another and transverse to the direction of the fluid flow, and further comprising a plurality of grooves provided in the wall, into which the plurality of inflow ducts issue, the plurality of grooves being connected to one another by at least one connecting groove,
   wherein the at least one connecting groove extends at right angles to the direction of the fluid flow.

12. The device in accordance with claim 11, wherein the at least one connecting groove has a constant cross-section.

13. The device in accordance with claim 12, wherein the groove has side walls and the side walls of the groove are provided at right angles to the surface of the wall.

14. The device in accordance with claim 12, wherein the groove has a constant depth.

15. The device in accordance with claim 12, wherein the component is a combustion chamber wall of a gas turbine.

16. A device for cooling a wall of a component, where a fluid flow flows parallel to the wall, comprising:
   at least one inflow duct having a center axis arranged inclined to a surface of the wall and a discharge opening,
   a groove provided in the wall, into which the at least one inflow duct issues,
   wherein a wall of the groove is contoured downstream of the discharge opening of the inflow duct and has an inflow edge facing the discharge opening,
   wherein the groove extends on both sides of the discharge opening and adjacent to the inflow edge at an angle to a direction of the fluid flow, and has a narrowing width,
   wherein the at least one inflow duct includes a plurality of inflow ducts with discharge openings arranged next to one another and transverse to the direction of the fluid flow, and further comprising a plurality of grooves provided in the wall, into which the plurality of inflow ducts issue, the plurality of grooves being connected to one another by at least one connecting groove,
   wherein the at least one connecting groove has a constant cross-section.

17. Device in accordance with claim 16, wherein the inflow edge is arranged at right angles to the surface of the wall.

18. Device in accordance with claim 17, wherein the side walls of the groove are provided at right angles to the surface of the wall.

19. Device in accordance with claim 17, wherein the groove has a constant depth.

20. The device in accordance with claim 17, wherein the component is a combustion chamber wall of a gas turbine.

* * * * *